United States Patent [19]

Rypka

[11] 4,267,804
[45] May 19, 1981

[54] NEUTRAL START AND CENTERING DEVICE FOR POWER TRANSMISSION MECHANISM

[75] Inventor: Dann B. Rypka, Owatonna, Minn.

[73] Assignee: Owatonna Manufacturing Company, Inc., Owatonna, Minn.

[21] Appl. No.: 873,897

[22] Filed: Jan. 31, 1978

[51] Int. Cl.² ............................................. H01H 3/00
[52] U.S. Cl. ..................... 123/179 K; 180/271; 74/527; 200/153 LA
[58] Field of Search ................. 74/473 R, 527; 123/179 K; 200/153 LA, 161, 153 K; 180/82 A

[56] References Cited

U.S. PATENT DOCUMENTS

| | | | |
|---|---|---|---|
| 1,086,773 | 2/1914 | Kells, Jr. | 123/179 K |
| 2,675,435 | 4/1954 | Framhein | 200/153 LA |
| 2,740,947 | 4/1956 | Davies | 180/82 A |
| 2,790,863 | 4/1957 | Towle | 200/161 |
| 2,826,286 | 3/1958 | Boyce | 74/527 |
| 2,882,045 | 4/1959 | Moore | 200/153 LA |
| 3,401,522 | 9/1968 | Hann et al. | 74/473 R |

FOREIGN PATENT DOCUMENTS 209095  12/1956  United Kingdom ........... 123/179 K

Primary Examiner—Kenneth Dorner
Attorney, Agent, or Firm—Merchant, Gould, Smith, Edell, Welter & Schmidt

[57] ABSTRACT

A switch operating mechanism associated with a motor driven hydrostatic system operative in forward or reverse directions with respect to a neutral inoperative state, for rendering a motor starting circuit operative only when the hydrostatic system is in its neutral state. An axially movable switch operating shaft has a notch therein which receives a detent on the control stem of the switch, only when the shaft is in a position generally centrally between opposite limits of its axial movement, to close the switch. A centering spring urges the shaft toward its centrally disposed position.

6 Claims, 2 Drawing Figures

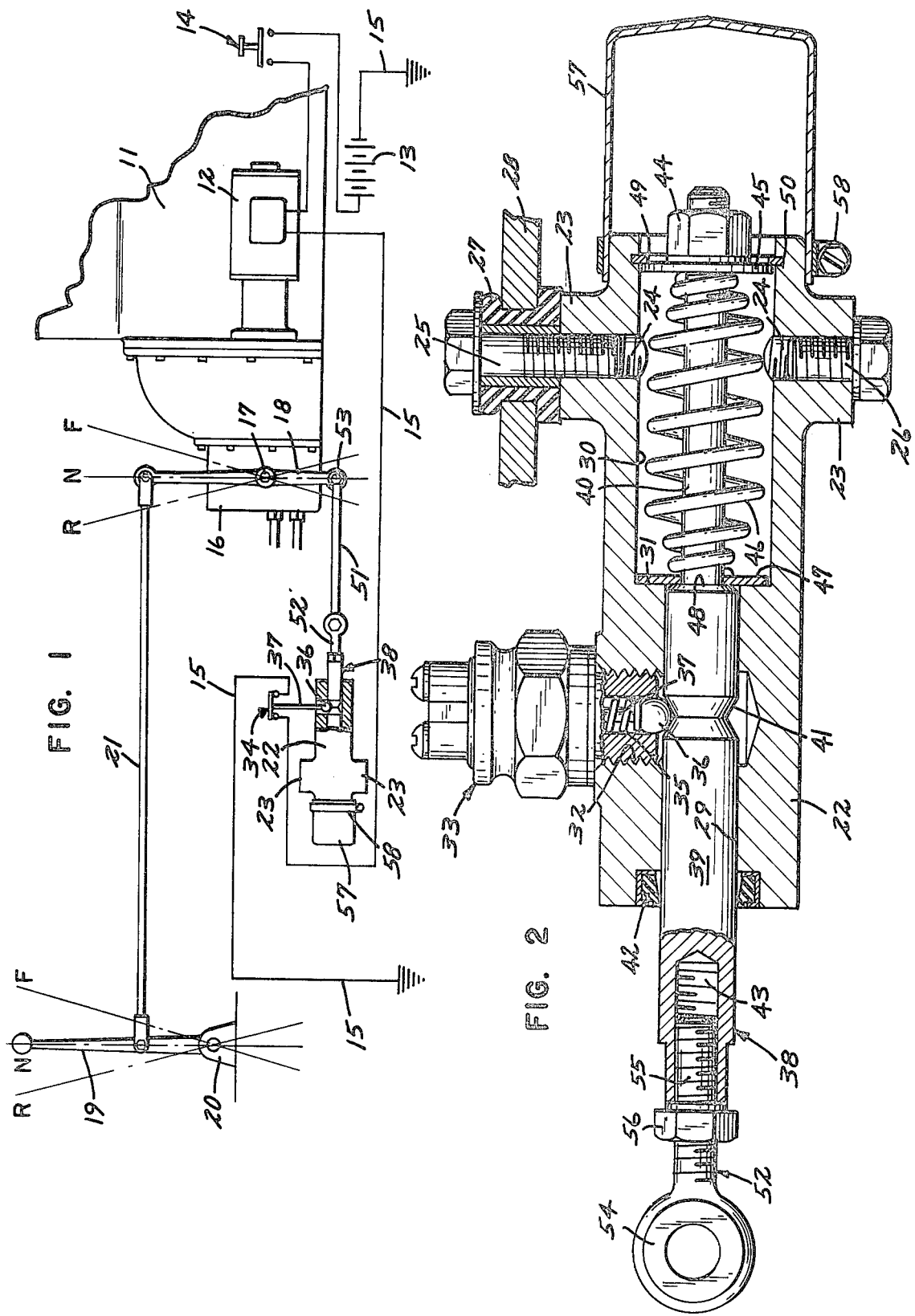

NEUTRAL START AND CENTERING DEVICE FOR POWER TRANSMISSION MECHANISM

BACKGROUND OF THE INVENTION

This invention relates to improvements in prime movers, such as tractors and like vehicles, particularly those using movable control members in the power transmission mechanisms thereof. More specifically, this invention is in the nature of a control device or interlock for preventing the engine of a vehicle, such as a tractor, from being started when the driving wheels or other power operated mechanisms of the vehicle are operatively coupled to the vehicle engine. The invention is particularly adapted to vehicles such as tractors having hydrostatic drive assemblies including one or more pumps driven by an internal combustion engine, and cooperating fluid motors connected to the vehicle drive wheels or other power driven apparatus. In many cases, the engine driven pumps are of the well known wobble plate controlled variety and operate between neutral, stationary, and forward and reverse drive dispositions.

The vehicle operator, in starting the tractor engine, does not always notice whether or not the drive mechanisms are in a neutral state. If the hydrostatic system is in a drive condition, the vehicle starts to move immediately upon starting of the engine. If the operator is not prepared for sudden unexpected movement, accidents may occur. An important object of this invention is, therefore, the provision of means for preventing a vehicle engine from being started unless the power transmission mechanism of the vehicle is in a neutral nonoperative state.

SUMMARY OF THE INVENTION

The centering and neutral starting device of this invention involves a switch having an axially movable operating stem and a detent at the end of the stem, a housing mounting said switch, a shaft axially movable in said housing and having a notch for reception of said detent. Centering means yieldingly hold the shaft against axial movements in opposite directions away from reception of the detent in said notch, and connector means are utilized for attaching said shaft to a mechanism for imparting said axial movements to the shaft.

DESCRIPTION OF THE DRAWINGS

FIG. 1 is a fragmentary diagrammatic view of an internal combustion engine having a hydrostatic pump affixed thereto, and showing the neutral start apparatus of this invention connected to the hydrostatic pump; and FIG. 2 is an axial section of the neutral start and centering device of this invention.

DETAILED DESCRIPTION OF THE PREFERRED EMBODIMENT

In FIG. 1, a conventional internal combustion engine is fragmentarily and diagrammatically shown and indicated generally at 11, the same being provided with the usual electrically operated starting motor 12 energized by a battery 13 and controlled by the usual normally open starting switch 14. The starting motor 12, battery 13, and starting switch 14 are connected in series in a grounded circuit lead 15.

Although not specifically shown, the engine 11 may be assumed to be the prime mover of a vehicle such as a tractor or self propelled agricultural or other type implement. For the purpose of the present example, the vehicle may be assumed to be a hydrostatically driven vehicle, the wheels of which are rotated by rotary hydraulic motors, not shown, but which are driven by fluid from a fluid pressure pump shown diagrammatically and indicated at 16 in FIG. 1. The pump 16 is preferably of the variable displacement pump variety controlled by a wobble plate, not shown, but which may be assumed to be connected to a control shaft 17 operated by a lever 18 to dispose the pump selectively in a neutral attitude, wherein no fluid is pumped to the hydraulic motors, and forward and reverse drive attitudes corresponding to positions of the lever 18 indicated by broken lines N, F and R.

The lever 18 is operated by a control handle 19 that is pivotally mounted at one end to a bracket portion 20 of the vehicle, and which is connected to the lever 18 by a control link 21. As shown, the control handle 19 is movable between reverse, neutral and forward positions, corresponding to similar positions or attitudes of the lever 18. The several positions of the control handle 1a are shown by broken lines in FIG. 1, also indicated at R, N and P. It will be appreciated that the volume output of the pump 16 is varied between 0 output at the neutral position of the control lever 18 and maximum output at the full reverse and forward positions of the lever 18, as is customary in hydrostatic transmissions.

The centering and neutral starting device of this invention includes an elongated body 22 having an opposed pair of bosses 23 adjacent one end thereof and having screw threaded openings 24 therein for reception of one or more mounting bolts 25, one of which is shown, the other being closed by a suitable plug, such as a screw 26. The bolt 25 extends through a sleeve equipped elastic bushing 27 in an opening through a wall element 28 which may be assumed to be a portion of a vehicle frame, the bushing 27 serving as a vibration dampening cushion. The body 22 is formed to provide a longitudinally or axially extending bore 29 which is diametrically enlarged adjacent said one end of the body 22 to provide a cylindrical recess 30 and an annular shoulder 31 between the bore 29 and recess 30. A screw threaded cross bore 32 is formed in the body 22 intermediate the ends of the bore 29, and screw threadedly receives the reduced diameter threaded end of the body 33 of a commercially available normally closed switch indicated at 34 in FIG. 1. The switch 34 is yieldingly held in a switch closed position by means of a coil compression spring 35 having one end engaging a ball detent 36 that is mounted on the outer end of a switch operating stem 37 that extends in a direction transversely of the bore 29. The stem 37 and ball detent 36 are yieldingly urged in said switch closing direction toward the bore 29.

An elongated shaft 38 extends longitudinally through the body 22, and has a larger diameter portion 39 that is axially slidably mounted in the bore 29, and a smaller diameter portion 40 that extends axially of the recess 30. The larger diameter portion 39 is formed to provide a circumferentially extending or transverse notch 41 that is adapted to receive the ball detent 36 of the switch 34. The portion 39 of the shaft 38 extends outwardly from the adjacent end of the body 22 through a conventional seal 42, the outer end of the portion 39 having an axial screw threaded opening 43 therein.

The outer end of the reduced diameter portion 40 of the shaft 38 is screw threaded to receive an adjustment nut 44 which operatively engages a washer 45 and holds the same in engagement with the outer end of a coil compression spring 46 that encompasses the reduced diameter shaft portion 40 within the recess 30. The inner end of the spring 46 engages a second washer 47 and yieldingly urges the washer 47 toward engagement with the annular shoulder 31 and with a second annular shoulder 48 on the shaft 38 between the portions 39 and 40 thereof.

Movement of the washer 45 in a direction axially outwardly of the recess 30 is limited by engagement thereof with a snap ring 49 mounted in an annular groove 50 in the side wall of the recess 30 adjacent the outer end thereof.

It will be noted, with reference to FIG. 2, that the distance between the ball detent 36 and the annular shoulder 31 is equal to the distance between the notch 41 and the annular shoulder 48 of the shaft 38. Thus, with the washers 45 and 47 engaging their respective snap ring 49 and shoulder 31 and the spring 46 being in a partially compressed state, the shaft 38 is yieldingly biased against axial movement in either direction away from a centered position wherein the ball detent 36 is received in the notch 41.

The shaft 38 is operatively connected to the control lever 18 by means of a rigid link 51 and an adjustable connector element 52. One end of the link 51 is pivotally secured to one end of the lever 18, as indicated at 53 in FIG. 1, the opposite end of the link 51 being connected to the other end 54 of the connector element 52. The connector element 52 has a screw threaded stem 55 that is longitudinally adjustably screw threaded into screw threaded opening 43 of the shaft 38, and is locked against movement relative to the shaft 38 by a lock nut 56 screw threaded thereon.

The annular seal 42 prevents dust or other foreign matter from entering the bore 29 from the adjacent end of the body 22. The opposite end of the body 22 is provided with a dust cap 57 that is secured thereon by means of a conventional clamping ring 58, and prevents foreign matter from entering the recess 30.

It will be noted that the connector element 52 is so adjusted with respect to the shaft 38 that, when the ball detent 36 is received in the circumferentially extended notch 41, the operating lever 18 and handle 19 are both in their neutral positions. In this position of the shaft 38, lever 18 and handle 19, the switch 34 is closed, and the starting motor 12 may be energized by closing of the manually operated switch 14, to start the engine 11. When the control handle 19 and control lever 18 are moved to their forward position, the shaft 38 is moved axially inwardly with respect to the housing 22, causing the ball detent 36 to be retracted to open the switch 34. During inward movement of the shaft 38, the washer 47 is moved axially away from the shoulder 31, compressing the spring 46 against the opposite washer 45. This compression of the spring 46 increases the yielding bias thereof against the washer 47, tending to move the shaft 38, lever 18 and control handle 19 toward their neutral positions. Moving the control handle 19 and lever 18 toward their reverse positions R, causes the shaft 38 to be moved in a direction to carry the washer 45 axially inwardly to compress the spring 46 against the washer 47 and shoulder 31, the notch 41 moving toward the adjacent of the body 22 and opening the switch 34.

In the event that the engine 11 is de-energized with the lever 18 and control handle 19 in either of their forward or reverse positions, and assuming that the spring 46 has insufficient strength to move the lever 18 and handle 19 to their neutral positions, the opened switch 34 will positively prevent a circuit from being completed through the starting motor 12 when the starting switch 14 is closed. Thus, the operator is reminded to place the control handle 19 in a neutral position before attempting to start the engine 11.

It will be appreciated with vehicles having a pair of independently operated hydraulic motors, each for a different one of a pair of spaced apart drive wheels, and each motor having a separate pump 16, each of a pair of operating levers would be provided with an independent centering device as above described, the switches 34 of the centering devices being arranged in series in the starting circuit, with the starting switch 14.

While I have shown and described a preferred embodiment of neutral start and centering device, and described a modified arrangement, it will be understood that the same is capable of further modification without departure from the spirit and scope of the invention, as defined in the claims.

What is claimed is:

1. In combination with an engine having a starting motor, a fluid pump operated by said engine, and a control lever for said pump and movable between a neutral position and spaced forward and reverse pump operative positions;
   (a) fixed housing means defining a bore;
   (b) a shaft extending axially through said bore and axially movable therein, said shaft having a transverse notch disposed within said bore;
   (c) a switch for said starting motor mounted on said housing and having an operating stem extending in a direction transversely of said bore;
   (d) a ball detent on the end of said stem for engagement with said shaft and reception in said notch, said ball detent sized with respect to said notch so that any appreciable axial movement of said shaft from a position wherein said detent is received in said notch will eject said detent from said notch to open said switch;
   (e) centering means yieldingly holding said shaft against axial movements in opposite directions away from said detent in said notch;
   (f) and connector means for attaching said shaft to said lever.

2. The combination defined in claim 1 further including a motor starting circuit comprising said switch and a manually operated normally open switch in series with said first-mentioned switch and said starting motor, said first-mentioned switch being closed only when said detent is contained in said notch.

3. In combination with a switch having an axially movable operating stem and a detent at the end of said stem:
   (a) a housing mounting said switch;
   (b) a shaft axially movable in said housing and having a notch for reception of said detent, said notch sized with respect to the detent so that any appreciable axial movement of said shaft from a position wherein the detent is received in said notch will eject the detent from said notch;
   (c) centering means yieldingly holding said shaft against axial movement away from reception of said detent in said notch;
   (d) connector means, adjustably movable longitudinally of said shaft, for attaching said shaft to a mechanism for imparting said axial movements to said shaft; and (e) means for locking said connector means in desired set positions of movement thereof.

4. In combination with a switch having an axially movable operating stem and a detent at the end of said stem:

(a) a housing mounting said switch;

(b) a shaft axially movable in said housing and having a notch for reception of said detent, said notch sized with respect to the detent so that any appreciable axial movement of said shaft from a position wherein the detent is received in said notch will eject the detent from said notch;

(c) centering means yieldingly holding said shaft against axial movement away from reception of said detent in said notch;

(d) a mechanism for imparting said axial movements to said shaft, said mechanism comprising a lever pivotably movable between spaced apart forward and reverse positions and an intermediate neutral position; and (e) connector means for attaching said shaft to said mechanism, said connector means including a rigid link connected at one end to said lever, and an adjustable connector element connected to said link and said shaft.

5. In combination with a switch having an operating stem axially movable between positions corresponding to open and closed positions of the switch, and a detent at an axial end of said stem;

(a) a housing mounting said switch;

(b) a shaft axially movable in said housing in a direction transverse to the direction in which said stem moves axially, and having a notch for reception of said detent when said stem is in said position corresponding to said closed position of the switch, said detent responsive to axial movement of said shaft, said notch being sized with respect to the detent so that any appreciable axial movement of said shaft from a position wherein the detent is received in said notch will eject the detent from said notch;

(c) connector means, adjustably movable longitudinally of said shaft, for attaching said shaft to a mechanism for imparting said axial movements to said shaft; and (d) means for locking said connector means in desired said positions of movement thereof.

6. In combination with a switch having an operating stem axially movable between positions corresponding to open and closed positions of the switch, and a detent at an axial end of said stem;

(a) a housing mounting said switch;

(b) A shaft axially movable in said housing in a direction transverse to the direction in which said stem moves axially, and having a notch for reception of said detent when said stem is in said position corresponding to said closed position of the switch, said detent responsive to axial movement of said shaft, said notch being sized with respect to the detent so that any appreciable axial movement of said shaft from a position wherein the detent is received in said notch will eject the detent from said notch;

(c) a mechanism for imparting said axial movements to said shaft, said mechanism comprising a lever pivotably movable between spaced apart forward and reverse positions and an intermediate neutral position; and (d) connector means for attaching said shaft to said mechanism, said connector means including a rigid link connected at one end to said lever, and an adjustable connector element connected to said link and said shaft.

* * * * *